United States Patent [19]

Letovsky et al.

[11] Patent Number: 5,006,072
[45] Date of Patent: Apr. 9, 1991

[54] HIGH PERFORMANCE MOTORCYCLE SIMULATOR AND HELMUT DISPLAY

[75] Inventors: Howard Letovsky, Los Angeles; Bernard Fried, Beverly Hills, both of Calif.

[73] Assignee: Bernie Fried Racing Enterprises, Inc., Beverly Hills, Calif.

[21] Appl. No.: 372,690

[22] Filed: Jun. 27, 1989

Related U.S. Application Data

[63] Continuation-in-part of Ser. No. 324,172, Mar. 16, 1989, Pat. No. 4,887,967.

[51] Int. Cl.$^5$ .............................................. G09B 9/04
[52] U.S. Cl. ......................................... 434/61; 434/69; 350/174; 358/104
[58] Field of Search ..................... 434/69, 61, 55, 56, 434/57, 58; 350/174, 171, 638, 601; 358/88, 104

[56] References Cited

U.S. PATENT DOCUMENTS

| | | |
|---|---|---|
| 2,063,323 | 12/1936 | Custer . |
| 2,510,579 | 6/1950 | Kail . |
| 2,514,762 | 7/1950 | Hayes et al. . |
| 2,524,238 | 10/1950 | Soule . |
| 2,695,783 | 11/1954 | Serafin . |
| 2,872,840 | 2/1959 | Stanton .............................. 350/174 |
| 2,955,156 | 5/1957 | Heilig . |
| 3,059,519 | 10/1962 | Stanton . |
| 3,205,303 | 3/1965 | Bradley . |
| 3,225,458 | 12/1965 | Glockl . |
| 3,449,843 | 6/1969 | Richter et al. . |
| 3,494,052 | 2/1970 | Colyon . |
| 3,526,042 | 9/1970 | Nelson . |
| 3,645,011 | 2/1972 | Callenen . |
| 3,686,776 | 8/1972 | Dahl . |
| 3,722,884 | 3/1973 | Brown . |
| 3,871,648 | 3/1975 | Maurer, III . |
| 3,890,722 | 6/1975 | Nunez . |
| 3,903,613 | 9/1975 | Bisberg . |
| 3,923,370 | 12/1975 | Mostrom ....................... 350/174 X |
| 3,964,546 | 6/1976 | Pittarelli . |
| 4,026,641 | 5/1977 | Bosserman et al. ............. 350/174 X |
| 4,049,262 | 9/1977 | Cunningham, Jr. . |
| 4,196,528 | 4/1980 | Foerst . |
| 4,303,394 | 12/1981 | Berke et al. . |
| 4,348,186 | 9/1982 | Harvey et al. . |
| 4,439,157 | 3/1984 | Breglia et al. . |
| 4,443,008 | 4/1984 | Shimano . |
| 4,580,983 | 4/1986 | Cassini et al. . |
| 4,584,896 | 4/1986 | Letovsky . |
| 4,709,917 | 12/1987 | Yang . |
| 4,722,601 | 2/1988 | McFarlane ....................... 350/174 X |
| 4,753,514 | 6/1988 | Kubik ................................... 350/174 |
| 4,753,596 | 6/1988 | Hart et al. . |
| 4,859,030 | 8/1989 | Rotier ................................. 350/174 |

OTHER PUBLICATIONS

Proc. Instn. Mech. Engr., "A Platform with Six Degrees of Freedom", D. Stewart, vol. 180, Pt. 1, No. 15, 1965-1966.

Primary Examiner—Richard J. Apley
Assistant Examiner—Jennifer L. Doyle
Attorney, Agent, or Firm—Poms, Smith, Lande & Rose

[57] ABSTRACT

A motorcycle simulator which is capable of providing six degrees of movement freedom to realistically simulate the sensory cues experienced while operating a high performance motorcycle. A helmet mounted video display system is also provided which provides a wide field of view image to enhance the simulator sensory cues.

5 Claims, 10 Drawing Sheets

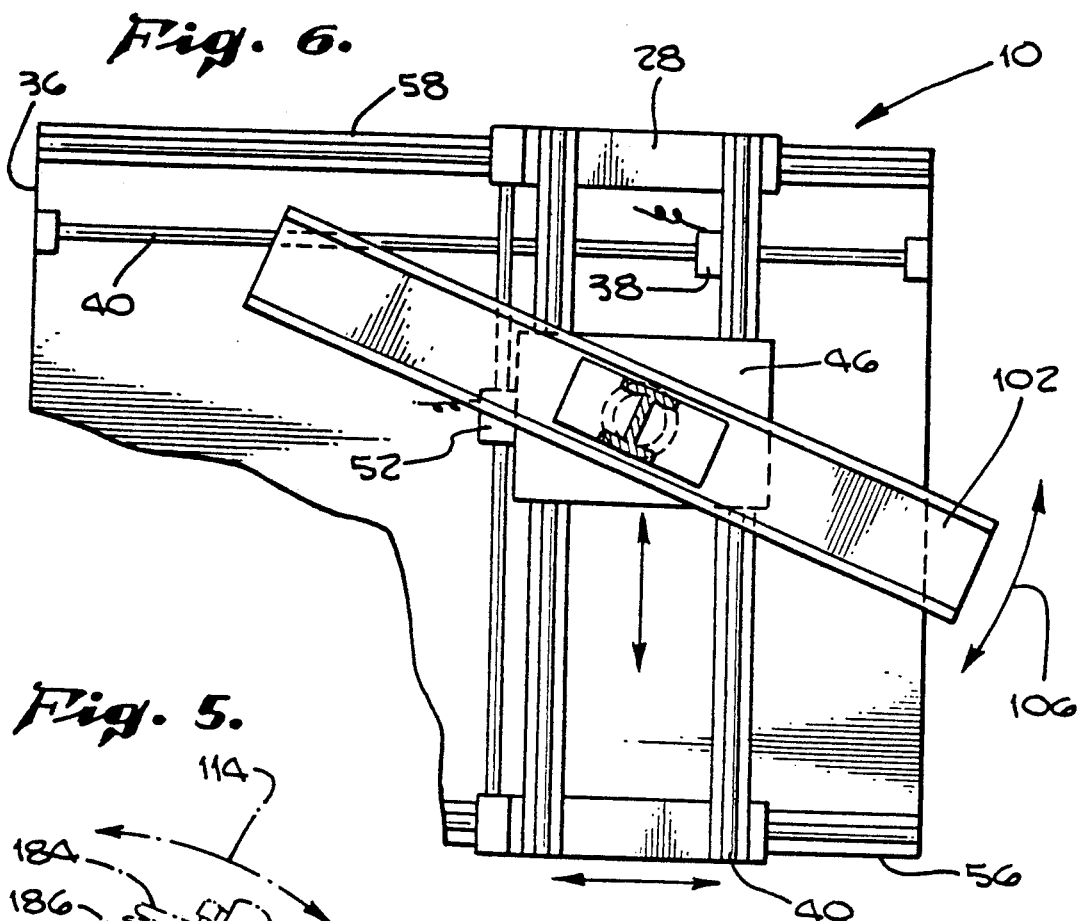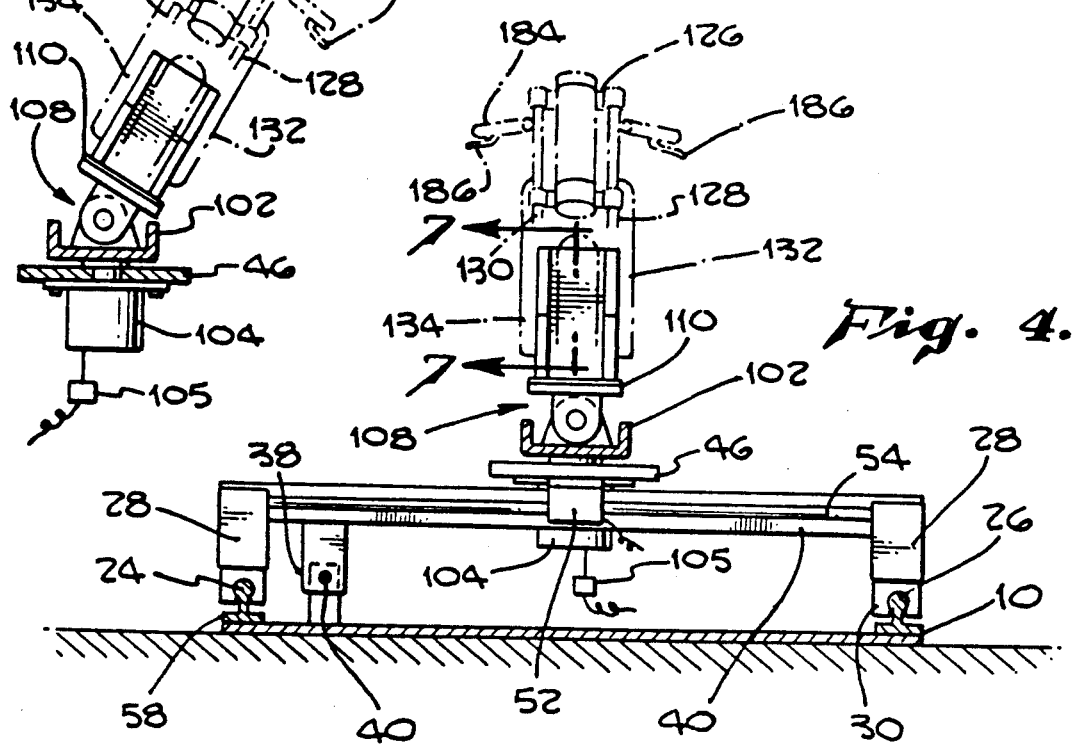

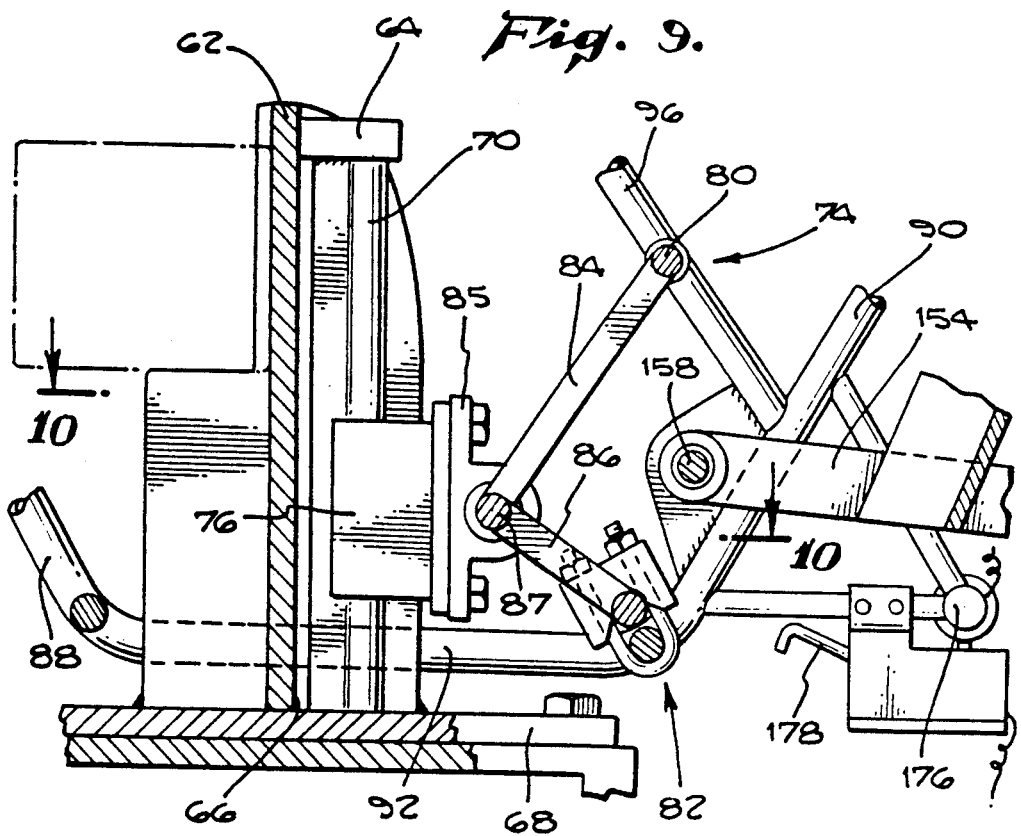
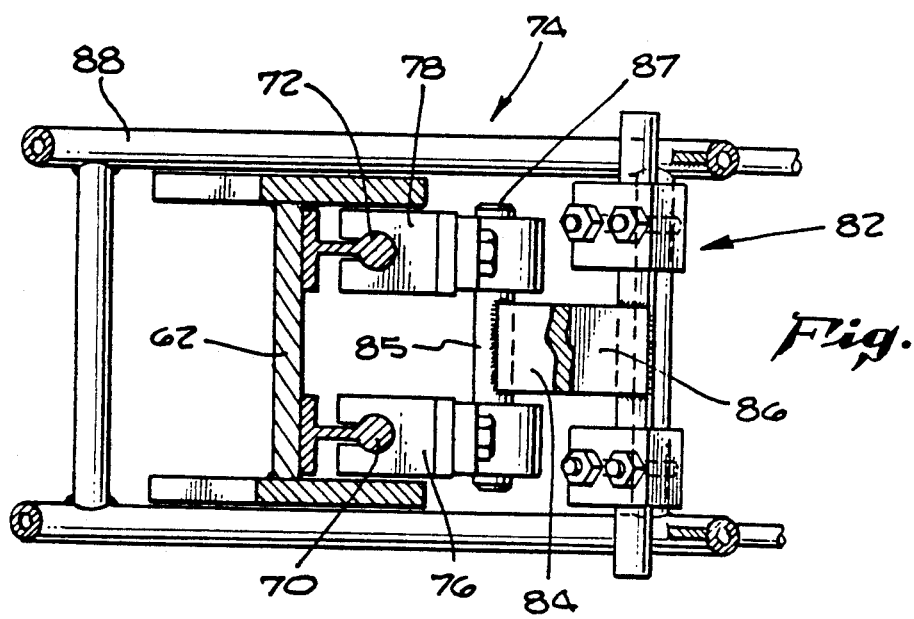

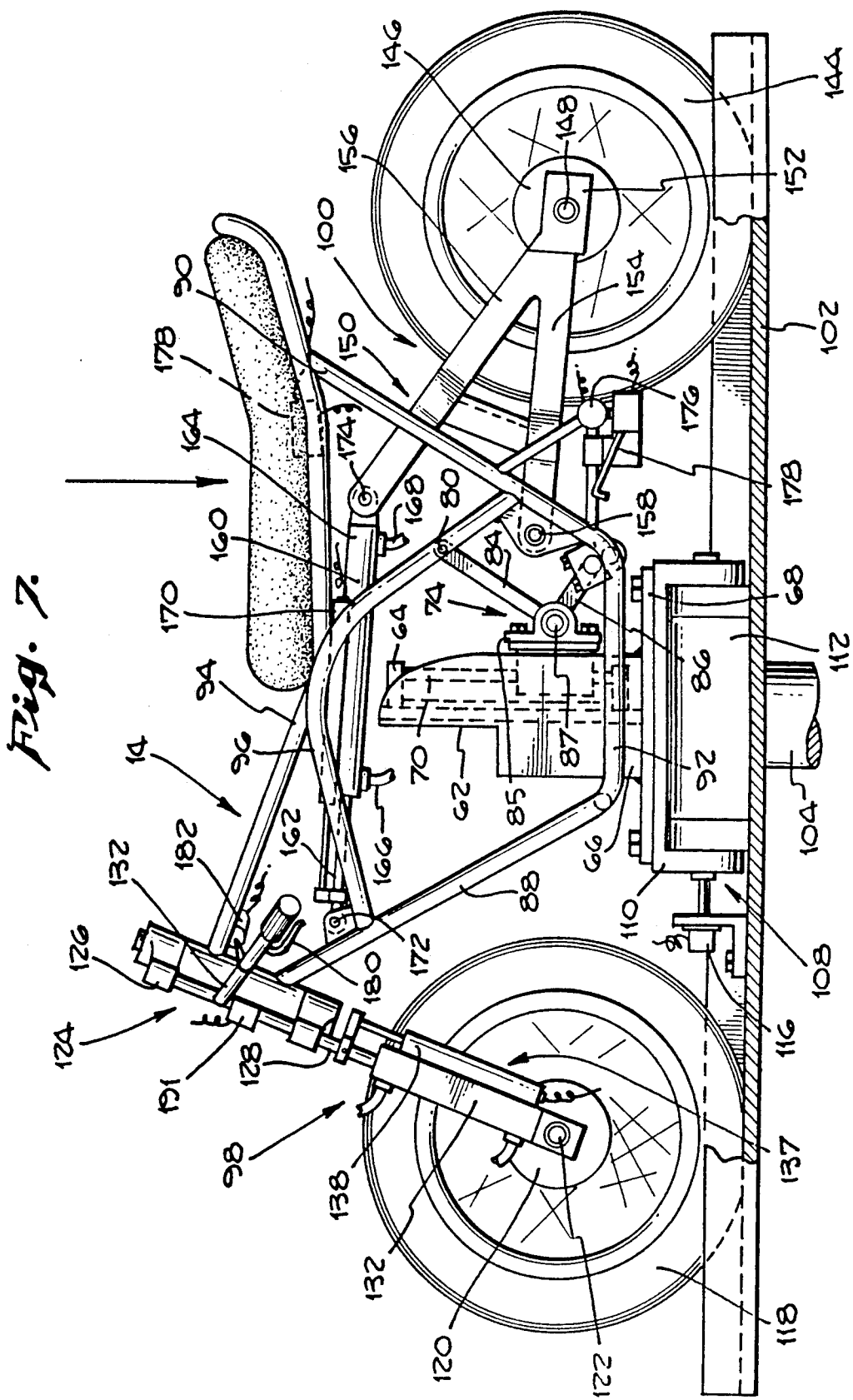

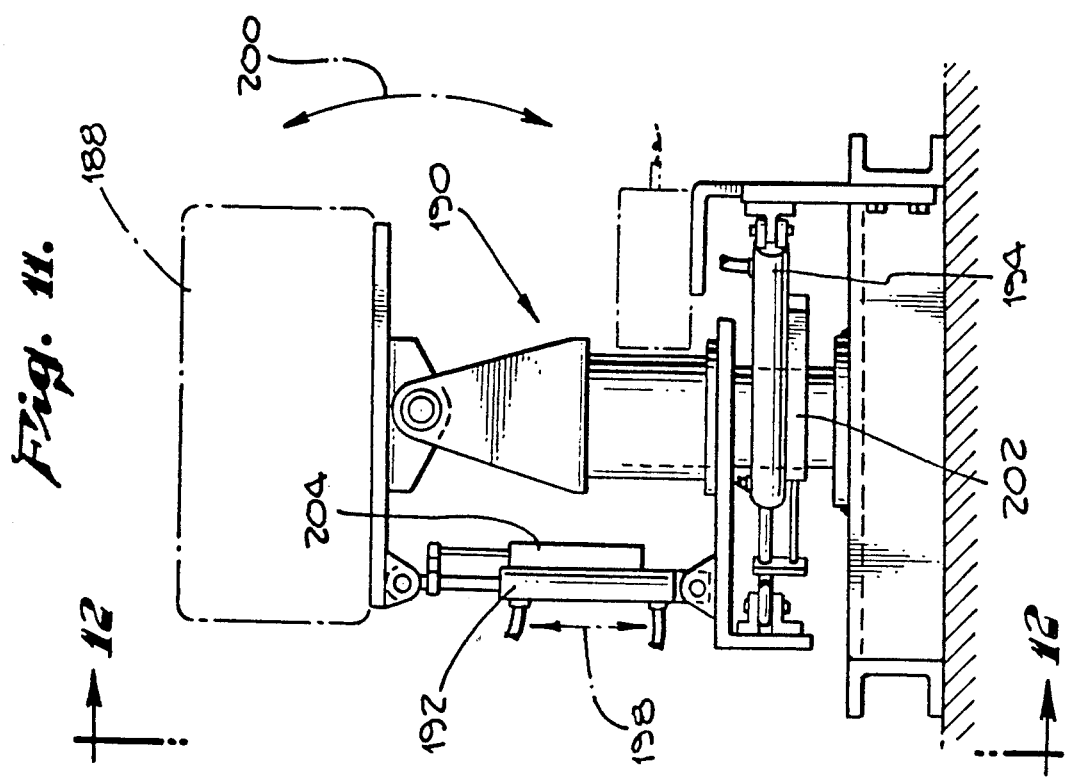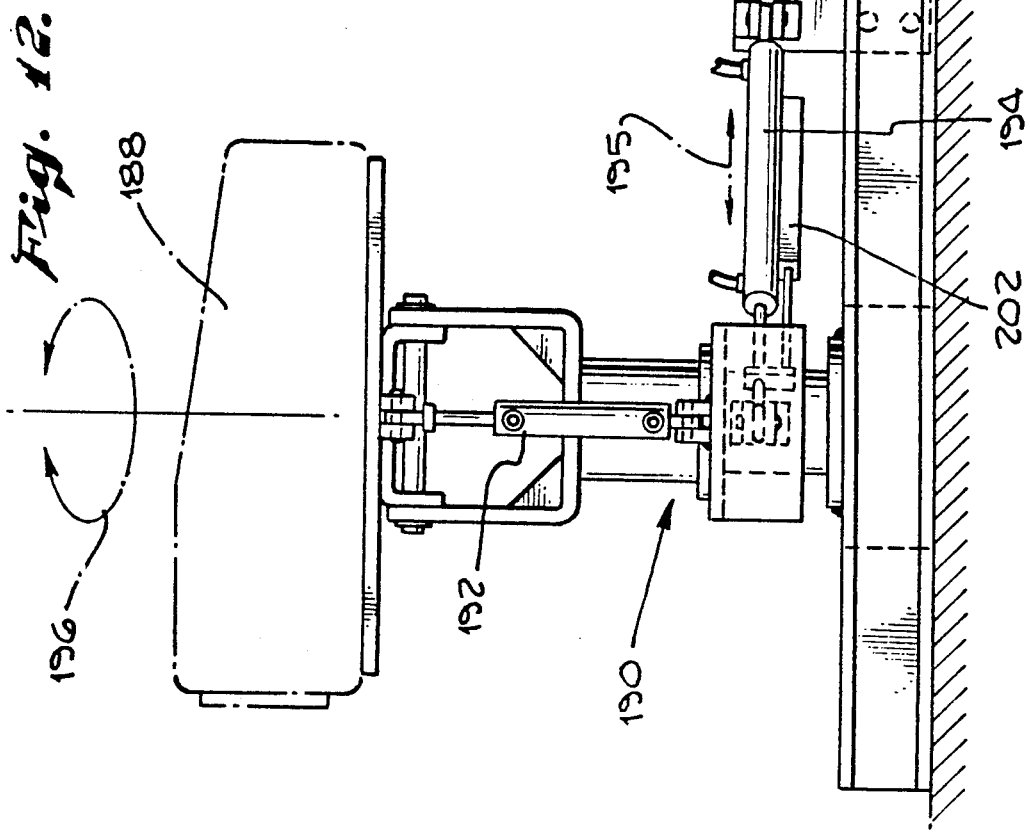

HIGH PERFORMANCE MOTORCYCLE SIMULATOR AND HELMUT DISPLAY

This application is a continuation-in-part of copending application Ser. No. 324,172 filed Mar. 16, 1989, now U.S. Pat. No. 4,887,967.

BACKGROUND OF THE INVENTION

1. Field of the Invention

The present invention relates generally to apparatus for simulating the forces, sensations and general experience of operating a high performance vehicle. More particularly, the present invention relates to an apparatus which has the sophistication necessary to realistically simulate the experience of riding a high performance motorcycle.

2. Description Of Related Art

The operation of high performance, high speed vehicles, such as airplanes, cars, boats and motorcycles carries with it a certain amount of risk. The risk of a crash is greatly reduced when the operator is experienced and has received proper training. In order to receive proper training and obtain the necessary experience, operators of high performance vehicles must be exposed to the full range of vehicle capabilities and emergency procedures. Whenever possible, the actual high performance vehicle is preferably not used for such training due to the high cost associated with operating the vehicle and the increased possibility of accidents and crashes during training. Accordingly, simulators have been developed for many high performance vehicles which are capable of providing a realistic simulation of the full range of vehicle capabilities.

Numerous sophisticated aircraft simulators have been developed which provide a realistic experience of flying high performance and transport category aircraft. The high cost of aircraft operation and disastrous nature of aircraft crashes has made the development of sophisticated and realistic aircraft simulators a necessity. However, the sophistication found in aircraft and aerospace simulators has not presently been applied to other vehicles such as motorcycles. In recent years, motorcycles have been developed which employ highly sophisticated drive trains and suspension systems. The result has been a drastic increase in the availability of high performance motorcycles which employ sophisticated technology. These motorcycles are capable of rapid acceleration to speeds in excess of 150 mph and have cornering capabilities which allow extremely high speed turns.

In order to make operation of the high performance motorcycle as safe as possible, it is desirable to provide thorough operator training. A thorough training program should include exposure to the entire performance envelope and capabilities of the motorcycle. In order to decrease the risk of injury to the operator during such training, it would be desirable to provide a motorcycle simulator which is capable of realistically simulating the experience of riding such a high performance vehicle.

Motorcycle simulators which have been developed in the past have been relatively unsophisticated devices. The motorcycle simulators disclosed in U.S. Pat. Nos. 3,526,042; 3,686,776; 3,964,564; and 4,049,262 are exemplary of the types of devices which have been suggested as motorcycle simulators. Although these simulators are well suited for their intended purpose, they are not capable of providing a realistic simulation of the forces and movements experienced when riding a high performance motorcycle.

There presently is a need to provide a motorcycle simulator which has the necessary degrees of freedom of movement to expose the motorcyclist to the full range of motion experienced during riding a high performance motorcycle. Further, it is desirable to provide a realistic visual display which will further enhance the simulator realism.

SUMMARY OF THE INVENTION

In accordance with the present invention, a simulator or simulation system is disclosed which provides a realistic simulation of riding a high performance motorcycle throughout the motorcycle's performance range. This full range of motorcycle simulation is made possible by utilizing a simulator motion which is base capable of movement with six degrees of freedom. Movement of the simulator through six independent axis (six different degrees of freedom) provides the motor-cycle rider with a realistic simulation of motorcycle riding which was not possible with previous simulators.

The motorcycle simulator in accordance with the present invention includes a support structure upon which a motorcycle mount assembly is attached. The motorcycle mount assembly is attached in such a way that the assembly can be swayed from side to side while simultaneously being surged forward or backward. The motorcycle frame, upon which the operator rides, is attached to the motorcycle assembly.

Yaw means are provided for controllably pivoting the motorcycle mount assembly and frame for horizontal rotation of the motorcycle frame. Roll means are also provided for simultaneously moving the motorcycle frame to inclined positions on the left or right side of vertical. In addition, front fork elevator means are provided for controllably lowering and raising the front end of the motorcycle frame. Rear fork elevator means are also provided for controllably lowering and raising the rear end of the motorcycle frame independently of the front fork elevator means. Simultaneously raising or lowering of the front and rear elevators provides a heave effect, or vertical translation of the motorcycle frame. Operating the front and rear elevators in opposition to each other provides a pitch effect, or vertical rotation about the midpoint of the motorcycle frame, thereby tilting the rider forward or backward. All of the preceding movements are combined to provide six degrees of movement freedom which provides a realistic simulation of riding a high performance motorcycle.

As a feature of the present invention, various operator inputs are provided, such as shift controls, clutch controls, throttle controls and brake controls. These controls allow the operator to input information into a computer which is programmed to control the various ranges of motion of the simulator in response to operator input. The computer is also programmed to provide preprogrammed control of motorcycle movement. The six degrees of movement freedom are controlled by actuator/encoder devices which include position feedback to a computer. The computer also receives input from the various operator input devices described above. The computer is programmed to receive and compare these inputs with a motorcycle simulation program and then input instructions to the simulator with regards to the movement and positioning.

As one feature of the present invention, means are provided for controllably blowing air past the motorcycle frame at selected wind velocities to thereby enhance the motorcycle riding experience. In addition, video display means are provided for presenting a visual representation which displays a view that is computer feedback controlled to simulate the motorcycle riding environment.

As an additional feature of the present invention, the video display means is provided by a helmet mounted visual display system which provides either a single or stereo image biocular wide field of view (FOV) display. The visual display system utilizes parabolic mirrors and/or collimating lenses to provide a variable FOV up to about 150° horizontal and about 100° vertical. The helmet mounted video display is well-suited for use in connection with the motorcycle simulator of the present invention and other motion based simulators.

As another feature of the present invention, a sound system is provided which is also computer feedback controlled to realistically simulate the sounds of a high performance motorcycle.

The above described and many other features and attended advantages of the present invention will become better understood by reference to the following detailed description when taken in conjunction with the following drawings.

BRIEF DESCRIPTION OF THE DRAWINGS

FIG. 4 is a view of FIG. 3 taken in the IV—IV plane.

FIG. 5 is a partial front view of FIG. 4 demonstrating rolling of the motorcycle frame to the left side of the vertical position.

FIG. 6 is a partial top view of the preferred exemplary motorcycle simulator demonstrating sway and yaw movement of the motorcycle mount assembly.

FIG. 7 is a side view of a preferred motorcycle frame and related assemblies wherein the motorcycle frame is in a lowered position.

FIG. 9 is a detailed view of a preferred motorcycle mount assembly.

FIG. 10 is a view of FIG. 9 taken in the X—X plane.

FIG. 11 is a side view of FIG. 1 taken in the XI—XI plane showing a preferred exemplary projector system for use in providing the visual display.

FIG. 12 is a view of FIG. 11 taken in the XII—XII plane.

DETAILED DESCRIPTION OF THE INVENTION

Figure 1:
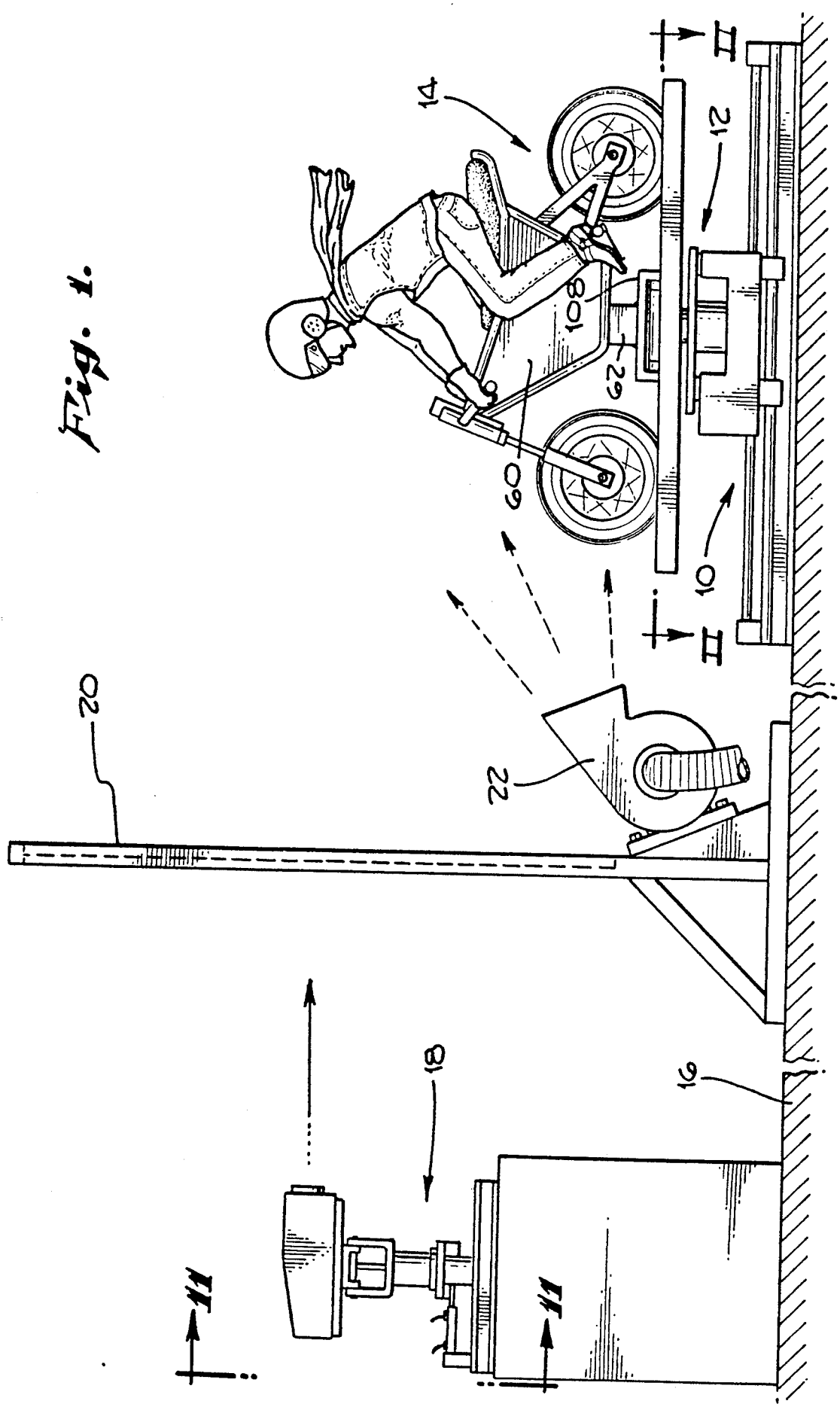
FIG. 1 is a side elevation view showing a preferred exemplary motorcycle simulator in accordance with the present invention.

A preferred exemplary motorcycle simulator in accordance with the present invention is shown in FIG. 1. The simulator includes a support structure 10, a motorcycle mount assembly 12 and a motorcycle frame 14. The simulator is shown mounted on a concrete slab 16; however, any suitable structural support surface may be used.

Video display means are provide by projector 18 and video display screen 20. The operation of the video display means will be described in detail below. A blower 22 is also provided as means for controllably blowing air past the motorcycle frame 14 at selected wind velocities. This aspect of the simulator will also be described later on in this specification.

Figure 2:
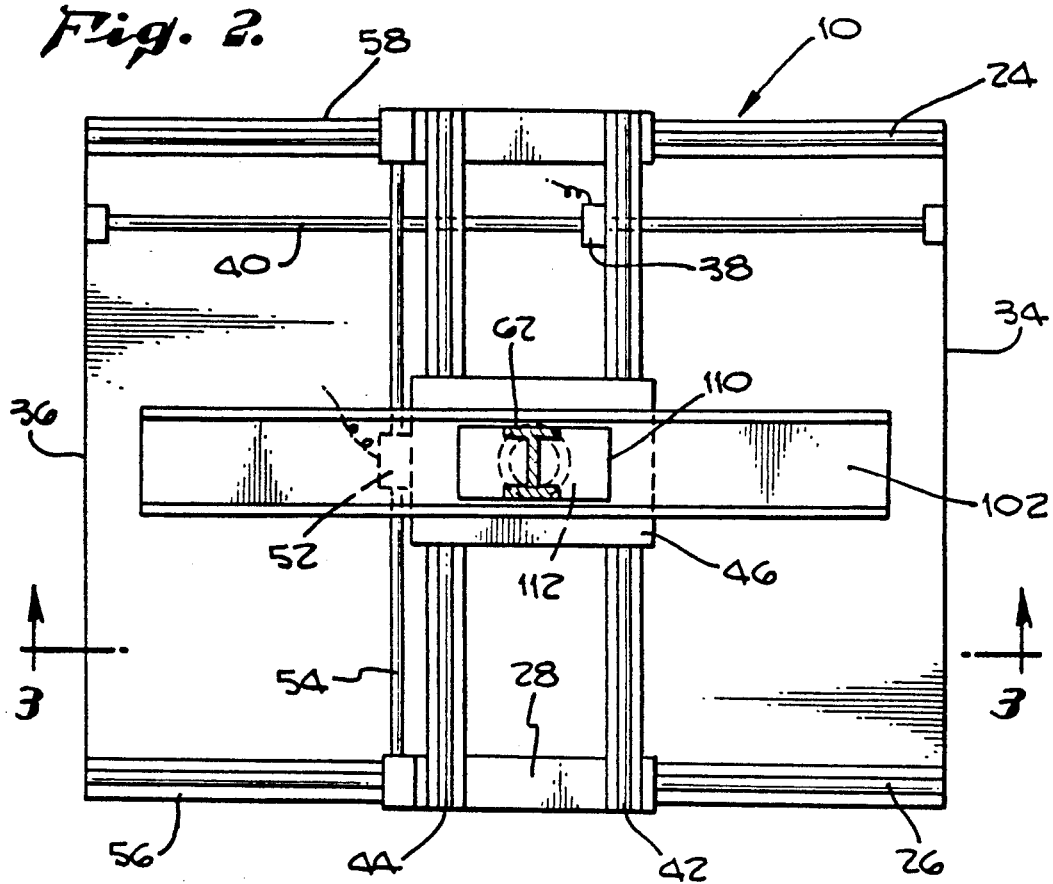
FIG. 2 is a view of FIG. 1 taken in the II—II plane.
Figure 3:
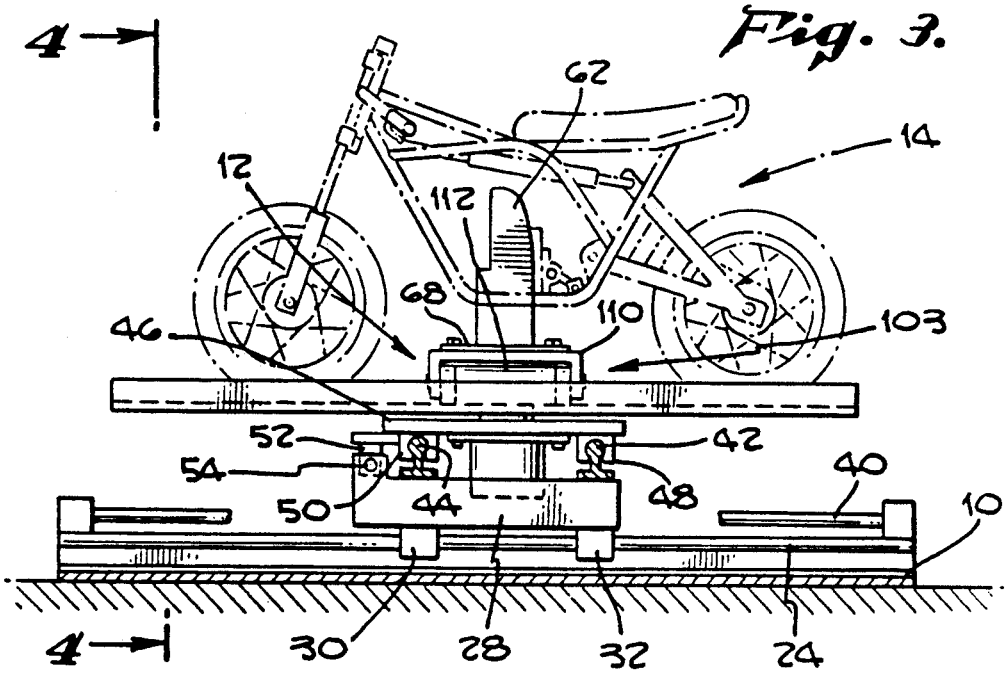
FIG. 3 is a view of FIG. 2 taken in the III—III plane.

As best shown in FIGS. 2 and 3, the support structure 10 includes surge rails 24 and 26. A surge sled 28 is mounted to the surge rails 24 and 26 by bearings or bushings as best shown at 30 and 32. The surge sled 28 is moved between the rear end 34 and front end 36 of the support structure 10. An actuator encoder device 38 is connected to rail 40 for measuring the location of the surge sled 28 and providing forward and aft movement of the sled 28 along rails 24 and 26. The actuator encoder 38 is connected to a central computer or data processing unit which receives information from actuator/encoder 38 on the location of sled 28 and provides instructions to actuator encoder 38 with respect to movement of the sled along rails 24 and 26. Separate actuator and encoder mechanisms may be incorporated into the sled and/or rail 24 or 26 to provide forward and rearward movement of sled 28. However, combined assemblies or devices which provide both the actuator and encoder functions are preferred.

Attached to the top of surge sled 28 are sway guide rails 42 and 44. A sway sled 46 is slidably mounted to sway rails 42 and 44 by way of bushings or bearing 48 and 50, respectively. An actuator encoder 52 provides measurement of the position of the sway sled 46 along rail 54 as the sled moves from the left side 56 to the right side 58 of the support frame 10.

In addition to providing position information with respect to sway sled 46, the actuator encoder 52 moves the sway sled 46 along rails 42 and 44. Other actuator means, either hydraulic, pneumatic or mechanical may be provided on rails 42 or 44 to move the sway sled 46 between left and right sides of the support structure 10. The actuator encoder 52—like actuator encoder 38— functions as a position feedback device wherein information on position of the sway sled 46 is transmitted to a central simulator computer which instructs the actuator encoder 52 to move the sway sled 46 appropriately. Actuator encoder devices are conventional assemblies which are known in the art.

The surge sled 28, sway sled 46 and their associated assemblies provide two degrees of movement for the motorcycle simulator. Two other degrees of freedom are provided by the motorcycle mount assembly 12 which is best shown in FIGS. 3-10 preferably, the motorcycle mount assembly 12 will be covered by housing 60 (see FIG. 1).

The motorcycle mount assembly 12 includes a tower 62 which has a top 64 and a bottom 66 which is connected to a base 68. Vertical guide rails 70 and 72 are securely connected to the tower top 64 and base 68. The means for attaching the motorcycle frame 14 to the vertical guide rails 70 and 72 is shown generally at 74. The mechanism includes bushing arms 76 and 78 which are attached to rails 70 and 72 respectively for slidable vertical movement. The bushing arms 74 and 76 are securely connected to the frame at locations 80 and 82 by way of connecting struts 84 and 86 respectively. The connection mechanism between guide rails 70 and 72 and the motorcycle frame 10 is exemplary only and other possible connecting locations and connection mechanisms are suitable provided that a strong attachment is made. Bearing plate 85 and pivot shaft 87 provide a secure mounting of the motorcycle frame 14 while allowing for the pivoting movement necessary as the frame 14 is raised and lowered. The motorcycle frame includes down tube 88, a rear tube 90, bottom tube 92 and backbone tubes 94 and 96. In the exemplary embodiment, the connecting arms 84 and 86 are shown connected to the backbone tube 96 and rear tube 90.

The connection of bushings 76 and 78 to guide rails 70 and 72 securely attaches the frame 14 to the motorcycle mount assembly 62 while still allowing vertical movement of the frame. The vertical movement of the frame is controlled by the actuator encoders associated with the front fork assembly 98 and rear fork assembly 100. These two assemblies and the means by which they are raised and lowered will be described in detail below.

The base 68 of the motorcycle mount assembly 12 is attached to the sway sled 46 by way of a pivot plate or channel 102. The pivot plate 102 is connected to the sway sled 46 by way of a rotary drive unit 104. The rotary drive unit 104 provides yaw means which rotate the pivot plate 102 as best shown by arrow 106 in FIG. 6. The rotary drive 104 is preferably a rotary drive unit which is capable of rotating the pivot plate 102 through at least 360 degrees of rotation and is preferably capable of providing infinite rotation if desired. Other suitable rotary drive units which are hydraulically, electromechanically or pneumatically actuated may be used provided they have sufficient power to rotate the pivot plate 102 at desired speeds and rates of accelerations.

Roll means for controllably moving the motorcycle mount assembly 12 from a vertical position as shown in FIG. 4 to inclined positions on the left or right side of vertical is provided by the roll actuator assembly shown at 108. The actuator assembly 108 includes a roll plate 110, which is securely attached to the base plate 68 of the motorcycle assembly 12. A gear driven roll actuator motor 112 is securely attached to the pivot plate 102 and roll plate 110 to provide controlled movement of roll plate 110 to move the roll plate 110 to various inclined positions as shown by arrow 114 in FIG. 5. An actuator encoder 116 is provided to measure the position of roll plate 110 and provide instructions to actuator motor 112. The actuator encoder 116 is connected to the same central computer or data processing unit as the other actuator encoders. The pivot rotary drive 104 also is attached to an encoder 105 which is connected to the central simulator computer.

The front fork assembly shown at 98 includes a front wheel 118, front brake 120, axle 122 and front fork 124. The front fork 124 includes a steering head 126, front fork actuator pistons 128 and 130 and front fork actuator cylinders 132 and 134. Handle bars 136 are also provided.

Front fork elevator means for controllably lowering and raising the front end of the motorcycle frame 14 is provided by the actuator encoder assembly 137 which is a combination of encoder 138 with the piston 128 and cylinder 132. The actuator encoder assembly 137 measures the relative position of the piston 128 and cylinder 132 and provides this input into the simulator computer. The cylinder 132 is hydraulically controlled via hydraulic lines 140 and 142 to provide extension and retraction of piston 128. The use of such hydraulic actuator cylinders are well-known, as is the use of actuator encoders. Although hydraulic raising and lowering of the front fork 124 is preferred, other types of actuator assemblies such as pneumatic or gear-driven systems may be used provided that a full range of motion is possible and extension and retraction speeds can be achieved which simulate the forces experienced during riding a motorcycle. Although only one actuator encoder assembly 137 is shown, such hydraulic actuation systems can be provided for both sides of the front fork assembly.

The rear fork assembly 100 includes a rear wheel 144, rear brake 146, rear axle 148 and swing arm 150. The swing arm has a rear end 152, which is attached to axle 148, a lower arm 154 and an upper arm 156. The lower arm 154 is securely attached to the motorcycle frame at 158. The attachment is by way of bushing, bearing or other conventional means to allow pivoting of the lower arm 154 about the mounting point 158.

Rear fork eleVator means for controllably loWering and raising the rear end of the motorcycle frame independently of the front fork is provided by a hydraulic actuator encoder assembly 160. The actuator encoder 160 includes a piston 162, which is hydraulically extended and retracted within cylinder 164 by hydraulic control through lines 166 and 168 encoder 170 which measures the relative positions of piston 162 and cylinder 164 and provides this information to simulator computer. The computer then provides input back to the actuator encoder 160 which controls the pressure within lines 166 and 168 to extend and retract the hydraulic actuator encoder 160. The hydraulic pressure to all the encoder/actuators is provided by a central hydraulic pressure unit (not shown).

Figure 8:
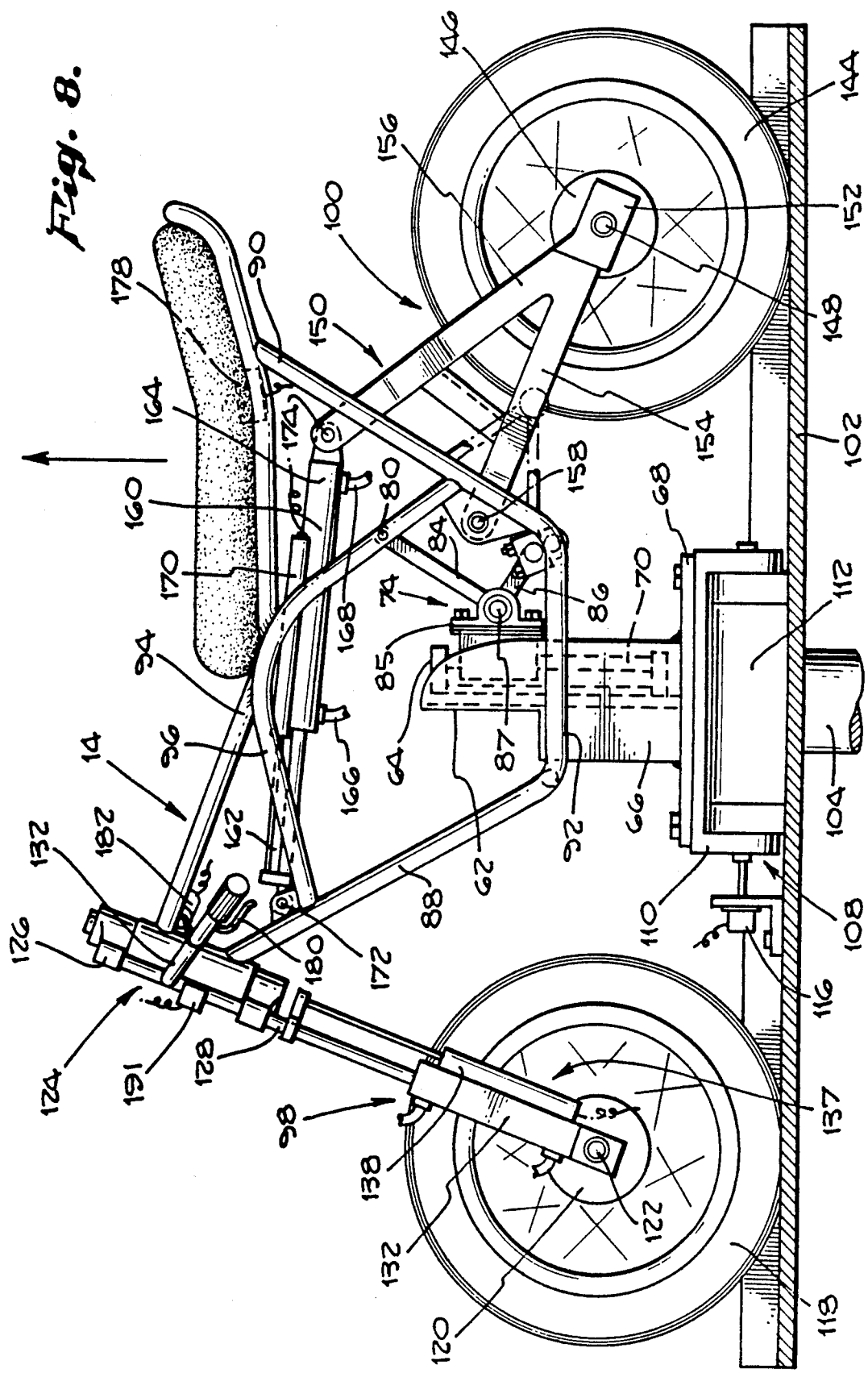
FIG. 8 is the same as FIG. 7 except that the motorcycle frame is in an elevated position.
Figure 13:
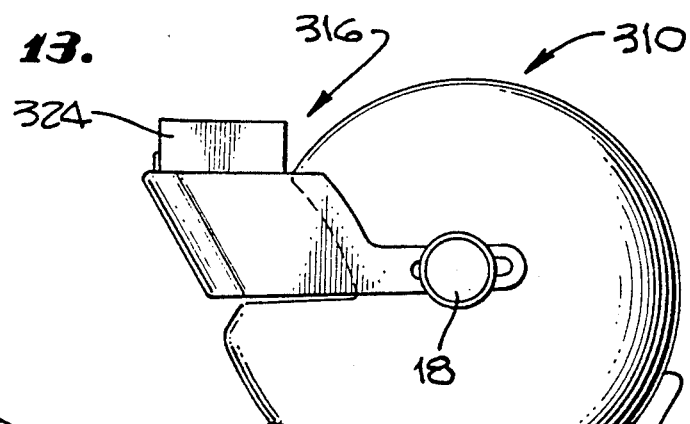
FIG. 13 is a side view of a preferred exemplary helmet mounted visual display system in accordance with the present invention.

The actuator encoder assembly 160 is connected to the frame at 172 and to the upper swing arm at 174. The connections at 172 and 174 are accomplished by bushings or bearings, as is conventionally known, to allow adequate pivoting of the parts. Extension and retraction of the hydraulic actuator encoder assembly 160 provides for raising and lowering the rear fork assembly 100 independently from the front fork assembly 98. The motorcycle frame 14 is shown in a lowered position in FIG. 7 where both the front fork assembly 98 and rear fork assembly 100 are in their lowered positions. FIG. 8 shows the motorcycle frame 12 when both the front fork assembly 98 and rear fork assembly 100 are in their raised positions. Although the front fork and rear fork assemblies are elevated by hydraulic actuators, other means for movement can be utilized such as pneumatic or mechanically driven systems.

A foot peg 176 (See FIG. 7) is provided which includes a pair of load sensors that measure the weight being applied to the foot pegs by the driver. This weight measurement is input into the simulator computer as part of certain input information which is compared and computed by the simulator program to provide operation of the various encoder actuators.

A pair of load sensors shown schematically in phantom at 179 are also provided under the seat to measure the rider's weight being applied to the seat. This weight measurement is also input into the simulator computer for comparison and computation by the computer to provide operation of the various encoder actuators in accordance with the simulator program. Also, a pair of load sensors is attached to the steering head assembly 126 as shown at 191. The load sensors 191 provide information to the computer regarding weight being applied by the rider to the handle steering head assembly 126. The use of load sensors to provide weight measurements is well known.

A shift lever and feedback sensor 178 is provided for allowing the operator to simulate shifting of gears on the motorcycle. The output from shift lever feedback sensor 178 is also sent to the simulator computer wherein this information is compared with other feedback sensors from the simulator and computed as part of the simulator program. A clutch lever sensor 180 is also provided which is interconnected to the central computer, wherein operation of clutch lever 180 properly affects the simulation program.

An actuator encoder 182 provides measurement of the position of steering head 126 and provides computer controlled actuated movement of the handle bars 136. The steering actuator encoder 182 is a conventional position feedback device which may provide resistance to turning of the steering head 126 or may force the steering head 126 in one direction or another depending upon user input and the particular simulator program. The actuator/encoder 182 provides a means for controlling the amount of operator force required to turn the steering head 126.

A throttle control 184 (See FIGS. 4 and 5) is also provided for allowing the operator to input throttle positions to the simulator computer. The throttle is operator controlled between opened and closed positions with a standard electro-mechanical device being provided to measure the location of the throttle. The throttle information is input into the computer along with information on shift lever 178 positioning to thereby provide engine rpm and an overall speed for the motorcycle. This information is preferably shown on a tachometer/speedometer assembly (not shown) which is visible to the operator.

The motorcycle also includes a front brake lever 186, which is operator controlled between braking and non-braking positions. Means for measuring the operator control of the front brake lever is provided by conventional electro-mechanical devices, such as a calibrated potentiometer whose input is entered into the simulator computer, wherein the positioning of the brake lever is compared with other inputs from the simulator and computed as part of the feedback loop. A rear brake lever (usually foot operated) is also included to provide operator input of the rear brake position between braking and non-braking position. The foot brake is typically included on a lower portion of the frame where it is operated by the rider's foot.

Encoder actuator assemblies (not shown), may also be used to provide rotation of the wheels 118 and 144. The speed at which the wheels 118 and 144 are rotated is computer controlled and depending upon inputs from the various actuator encoder assemblies including those associated with the throttle control 184 brake controls 120 and 146, and shift lever 178.

The blower 122 is capable of simulating wind velocities accurately synchronized to the motorcycle's simulated velocity. The blower 122 is controlled by the simulator computer program which receives inputs from the throttle control 184 and shift lever 178 to thereby determine motorcycle speed. Preferably, a housing (not shown) is provided to cover the blower system.

Video display means are included for providing a visual representation which simulates the riding of a motorcycle. The video display is provided by a projector assembly 18 and video screen 20 (See FIG. 1). Although this preferred exemplary embodiment utilizes a projector and screen arrangement, other video display systems are possible, including visor display systems wherein the video image is displayed by a visor placed in the operator's helmet. These type of video displays are commonly referred to as a head-up displays and are well-known.

Preferred exemplary embodiments of head-up displays or helmet mounted visual display systems in accordance with the present invention are shown in FIGS. 13-19. Although these helmet mounted visual display systems are preferred for use in conjunction with the motorcycle simulator described herein, those skilled in the art will recognize that the helmet mounted visual display systems may also be used in connection with other motion based simulators. Further, the helmet mounted visual display system may be used by itself to provide a visual experience or simulation apart from any motion based simulator.

A preferred exemplary helmet mounted visual display system is shown generally at 310 in FIGS. 13-16. The system 310 includes a helmet 312 which is of conventional design and designed to fit on the individual's head. The interior of the helmet is provided with conventional fitting devices so that the helmet may be worn by a wide variety of individuals. The helmet includes a front visual opening 314 through which the individual views the video display. A visor assembly 316 is mounted to the helmet as shown at 318. Other means for mounting the visor assembly may be used provided that the visor assembly 316 may be rotated upward and adjusted fore and aft. In the present embodiment, slot 320 is provided in visor frame 322 to provide fore and aft adjustment of frame 316.

Figure 16:
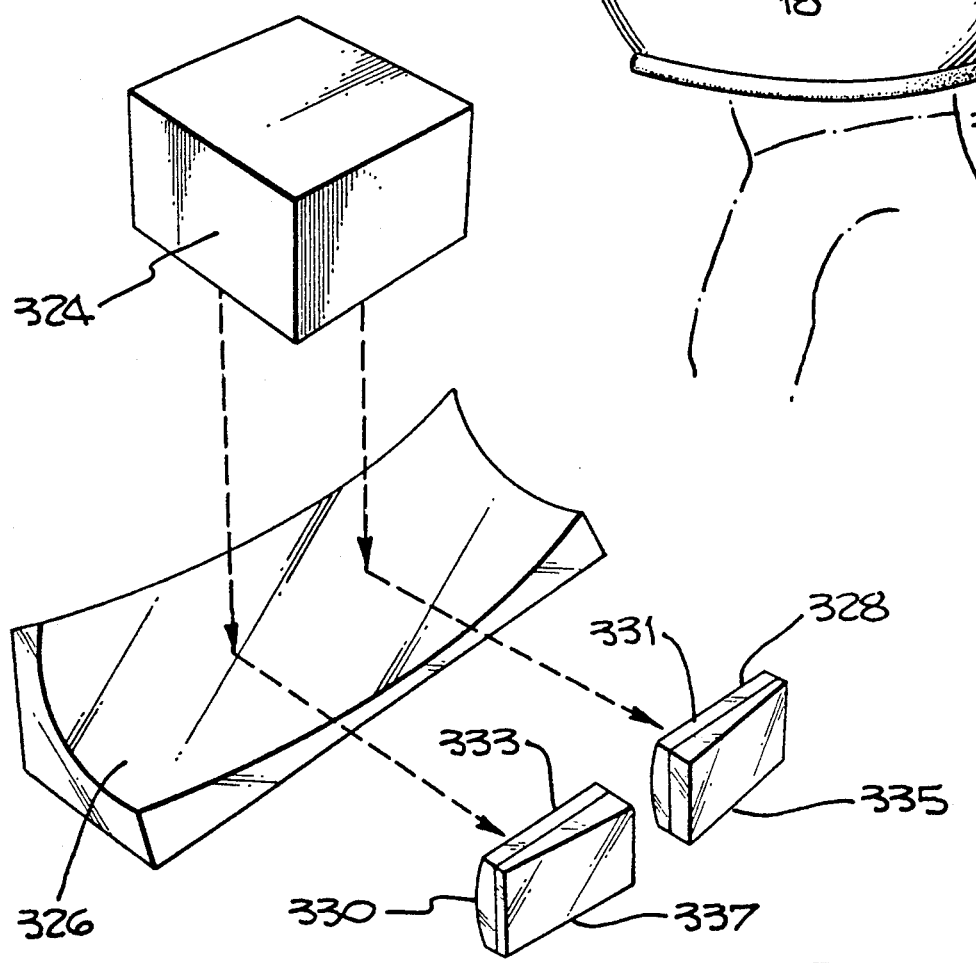
FIG. 16 is a simplified view of the visual display system of FIG. 13 showing the relationship between the video display screen, parabolic mirror and prismatic collimating magnifying lenses.
Figure 14:
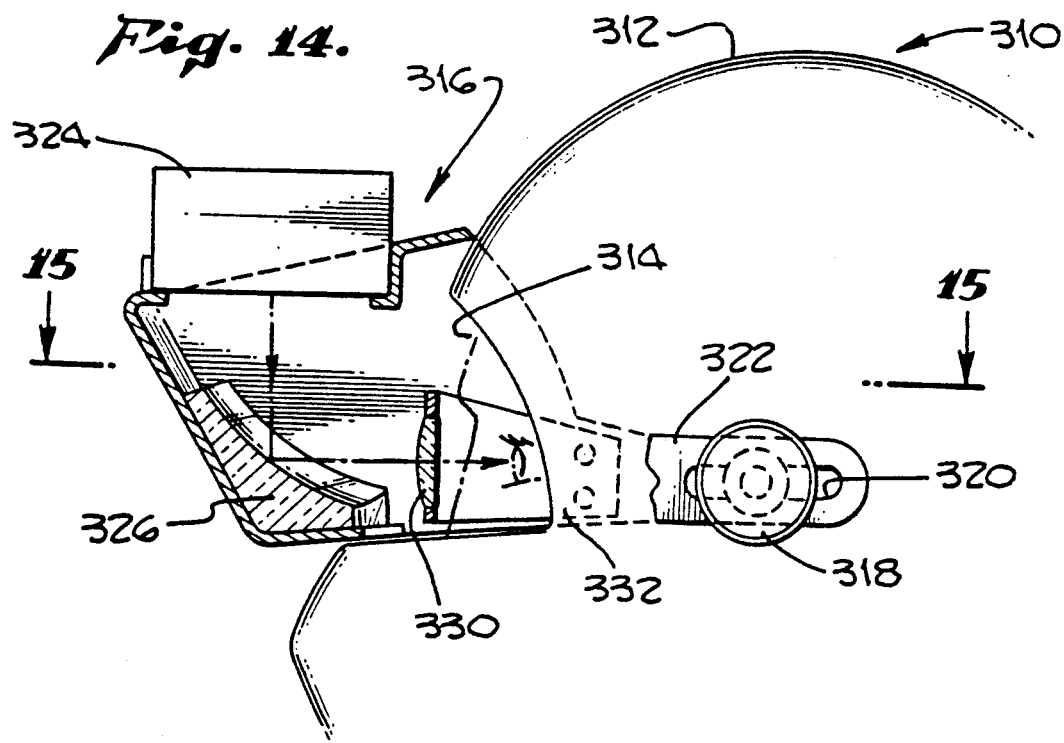
FIG. 14 is a partial sectional view of the preferred exemplary helmet mounted visual display system shown in FIG. 13.

The visor assembly 316 as best shown in FIGS. 14 and 16 includes a horizontal video display 324, parabolic mirror 326 and prismatic collimating magnifying lenses 328 and 330. The video display 324 can be any of the miniaturized liquid crystal displays (LCD) which are commercially available. The video display 324 is connected to a suitable video source which provides signals for the desired video images. The video display 324 is oriented to provide a horizontal image which is converted to a vertical image by the parabolic mirror 326. See FIG. 16 where phantom arrows depict the conversion of the horizontal video display 324 to a vertical video display.

Figure 15:
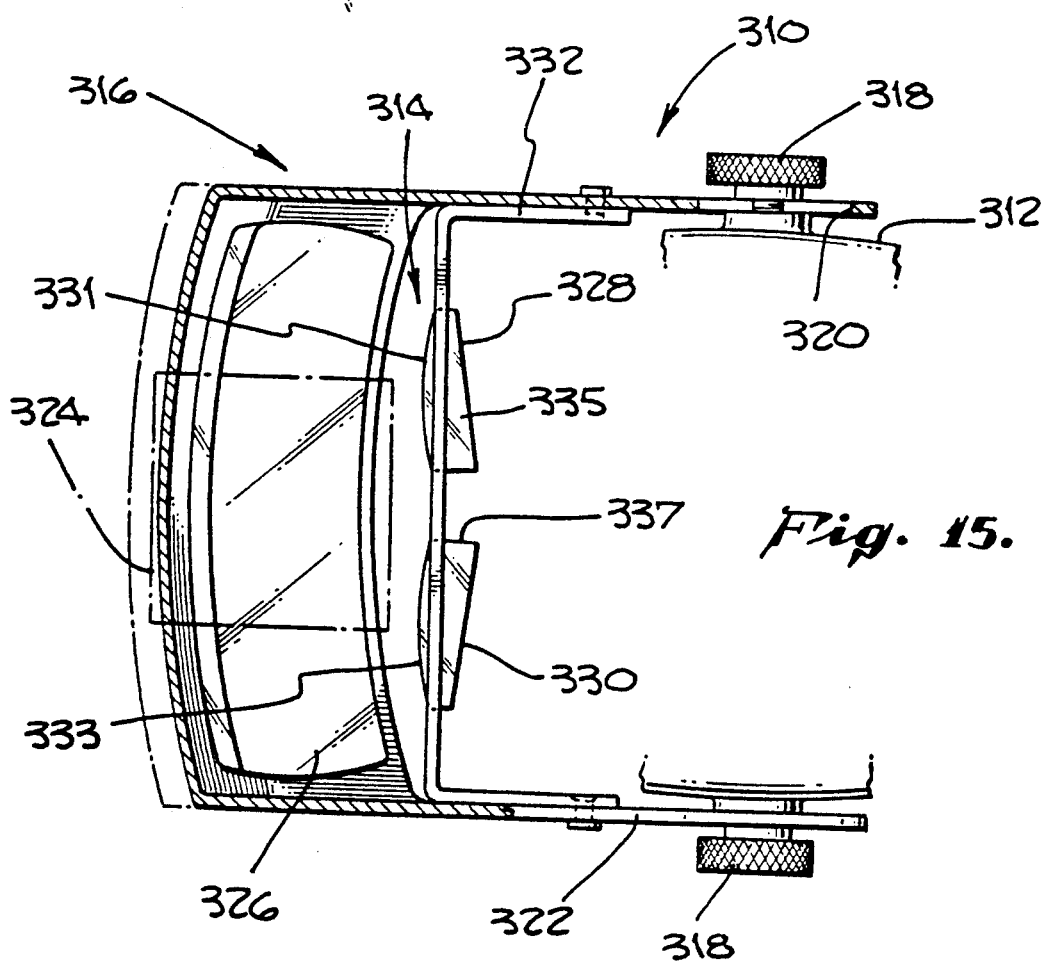
FIG. 15 is a view of FIG. 14 taken in the XV—XV plane.

The parabolic mirror 326 is shaped as shown in FIGS. 14-16 to not only redirect the video display, but to also expand the video image. The expansion ratio of the parabolic mirror is preferably between about 2 to 6. An expansion ratio of about 4 is preferred. In addition, diffusion coatings on the parabolic mirror are preferred to optimize the video image by minimizing the inherent visual distraction created by the pixel spread of the LCD display.

The prismatic collimating lenses 328 and 330 are preferably mounted within the visor assembly as best shown in FIGS. 14 and 15. The lenses include a magnifying portion 331 and 333; and a prism portion 335 and 337. The mounting bracket 332 may be riveted or otherwise securely attached to the visor assembly frame 322. The lenses 328 and 330 must be of optical quality to prevent any distortion of the video image. The lenses must have a magnification power of from 0 to 10. Magnification powers of about 6 are preferred. In accordance with the present invention, the overall field of view seen by the individual may be varied up to approximately 150° horizontal and 110° vertical by optimizing the expansion ratio of the parabolic mirror 326 and the prismatic lenses 328 and 330. The exact combination of parabolic mirror expansion ratio and lens magnifying power can be varied to obtain the desired overall field of view for the individual.

Figure 17:
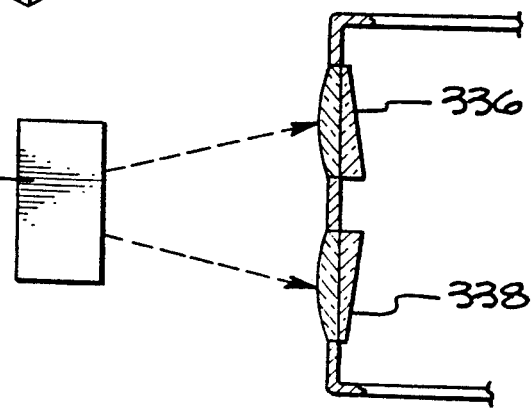
FIG. 17 is a simplified top view of a preferred alternate embodiment in which a vertical video display is used and the parabolic mirror is removed.

A second exemplary embodiment is shown in FIG. 17. This embodiment is similar to the display system shown in FIGS. 13-16 except that an LCD display 334 is mounted on the assembly frame to provide a vertical video display which is expanded and focused at infinity by prismatic collimating lenses 336 and 338. The vertical video display in FIG. 17 is represented by phantom lines. The magnifying power and configuration of the lenses 336 and 338 must be adjusted to compensate for the lack of expansion of the image provided by the parabolic mirror in the preceding preferred embodiment. In both embodiments, the prismatic collimating lenses are chosen to provide focussing of the video image at infinity to thereby provide a realistic image to the individual wearing the helmet.

Figure 18:
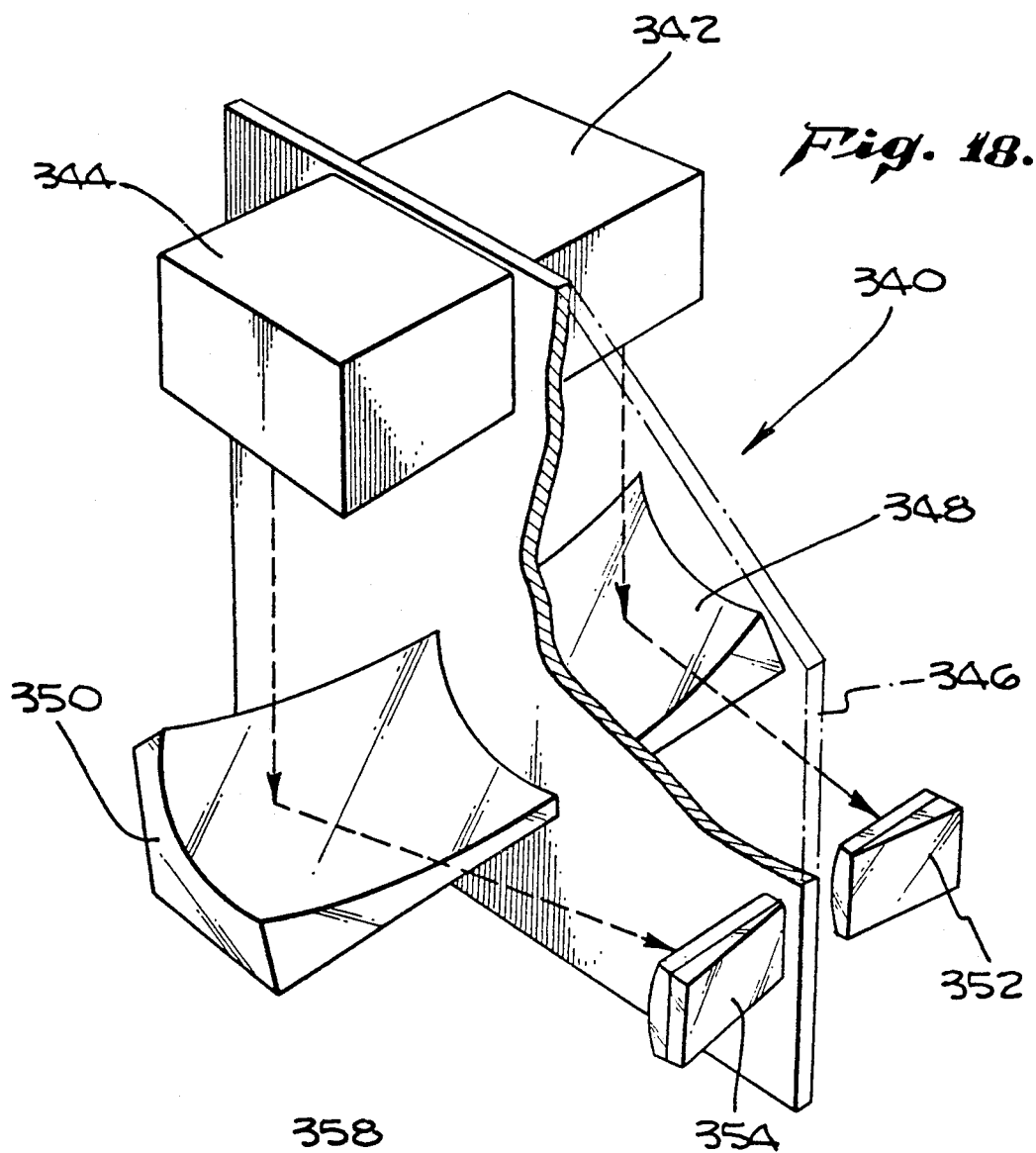
FIG. 18 is another preferred exemplary visual display system in accordance with the present invention wherein a stereo visual display is provided.

An additional preferred exemplary embodiment in accordance with the present invention is shown at 340 in FIG. 18. This embodiment is similar to the first preferred embodiment shown in FIGS. 13-16 except that two LCD video displays 342 and 344 are used to provide a stereo image. The stereo or binocular image overlaps to provide a stereo display. A wall or plate 346 separates the two images from displays 342 and 344 to provide the stereoscopic display. Parabolic mirrors 348 and 350 provide redirecting and expansion of the video images in the same manner as the previously described embodiments. If desired, the parabolic mirrors 348 and 350 may be formed from a single mirror which is divided in half by wall 346.

Prismatic collimating lenses 352 and 354 are also provided in the same manner as the previous embodiments to expand the video displays reflected by parabolic mirrors 348 and 350 to provide focussing of the displays at infinity.

Figure 19:
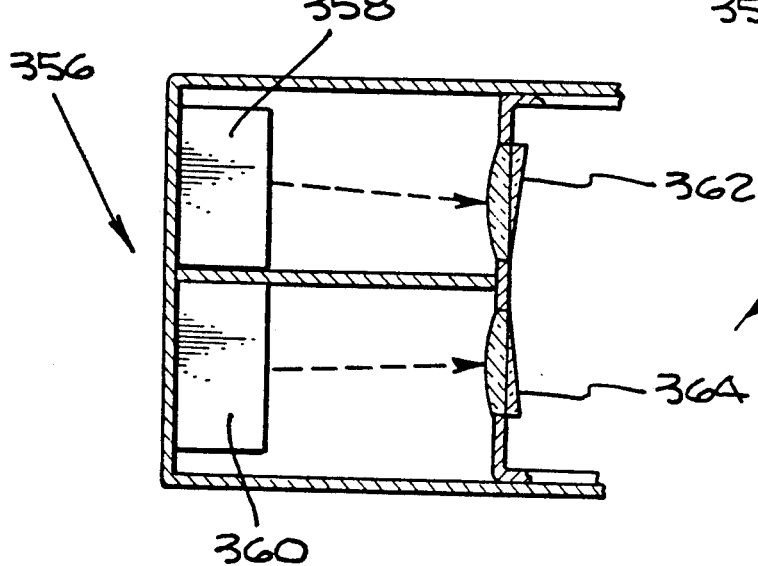
FIG. 19 is an additional preferred exemplary embodiment for providing a stereo visual display wherein a vertical video display is utilized and the parabolic mirror used in the system of FIG. 18 is removed.

Another embodiment of the present invention is shown generally at 356 in FIG. 19. This preferred embodiment 356 is similar to FIG. 18 in that it includes two video displays 358 and 360. The video displays 358 and 360 are oriented to provide a vertical video image which is displayed directly onto prismatic collimating lenses 362 and 364. This configuration is similar to the embodiments shown in FIG. 17 wherein in the parabolic mirror is removed and the video display oriented to provide a vertical video image which is expanded and focussed directly by the collimating prismatic lenses for viewing by the individual.

In all of the above displays, the overall field of vision is completely variable up to approximately 150° horizontal and 110° vertical. Variations in the field of view is accomplished by varying the expansion ratio of the parabolic mirrors (if used) and the magnifying of the prismatic collimating lenses. The input or signals to the video display unit is computer controlled to provide video images which correspond to the motorcycle positioning, simulated velocity and movements. The above described assemblies provide advantages in that the packaging of the visual display system is compact and easily carried on a helmet such as that typically worn by a motorcycle rider or racer. Further, the location of the video display system achieves a center of gravity which is close to the user to thereby minimize torsional forces on the helmet. Also, the system provides the utilization of small LCD displays (one to three inch screens) to create very wide field of views which provide realistic images which enhance the simulator experience. The size of the field of view to which the LCD image is expanded can be varied to any size desired with the only limitation being the resolution of the LCD display.

In order to maintain a stationary field of view during movement of the helmet, the video displays are preferably on gimbals (not shown) so that the displays remain stable horizontally and vertically during helmet movement. Alternatively, a sensor may be placed on the helmet to sense helmet position. The sensor position information is input into the computer which corrects the video image so that it remains stationary during helmet movement.

The helmet also preferably includes a sound system which is programmed by the computer to provide a sound track that simulates engine and road noise. The sound system can be located outside the helmet; however, placement of speakers inside the helmet is preferred to enhance the sound simulation. A sensor (not shown) may also be connected to a device worn by the rider to provide an accurate measurement of the rider's location on the simulator. The location measurements provided by the sensor is input into the computer for inclusion in the comparisons and computations which are carried out by the computer program. Location sensors and their use are well known.

Referring to FIGS. 11 and 12, the projection assembly includes a projector 188, which is mounted on a linkage assembly 190. The linkage assembly 190 includes actuator encoders 192 and 194. Actuator encoder 194 is computer controlled to extend and retract as represented by arrow 195. The retraction and extension of actuator encoder 194 provides movement of the projector 188 as shown by circular arrow 196. The actuator encoder 192 is extended and retracted as shown by arrow 198. Retraction and extension of actuator encoder 192 tilts the projector 188, as represented by arrow 200. The actuator encoders 192 and 194 operate in the same manner as the actuator encoders utilized for hydraulically actuating the front and rear fork assemblies. They include the encoder devices 202 and 204, which measure the positions of the actuator assemblies and input this information into the simulator computer. The input is compared with other inputs into the computer and computed to provide instructions for hydraulic actuation of the devices through the hydraulic lines shown.

The various linkages and mounting attachments for the projector 188, as shown in the drawings, are conventional. Other linkage arrangements are possible provided that the necessary rotation and tilting of the projector is provided.

The computer and computer programs which are used in conjunction with the simulator can be any computer hardware and software system which is capable of receiving operator inputs and comparing and computing these operator inputs to a simulator program and thereby compute the positioning and movement of the various actuators, wind system, sound system and video system. Such feedback systems and computer control are well-known with respect to aircraft simulators and the like, and are equally applicable to the present motorcycle simulator. Preferably, an input panel will be provided on the motorcycle frame, wherein the operator can input information regarding the type of riding experience desired. Further, a fail-safe switch is provided allowing the operator to shut down simulator operation at any time whereby the motion platform returns to its neutral or home position. In addition, override controls can be included to allow an instructor or other individual to input various commands to control operation of the actuator encoders.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is limited only by the following claims.

What is claimed is:

1. A helmet mounted visual display system for providing a wide field of view video display to an individual wearing the helmet, said visual display system comprising:

(A) a helmet shaped to be worn by an individual, said helmet having a surface defining a front visual opening in front of the individual's eyes;

(B) a visor assembly located in front of said front visual opening, said visor assembly comprising:
   (a) a horizontal video display;
   (b) a parabolic mirror having a curvature sufficient to expand said horizontal video display and being positioned to reflect said horizontal video display to provide a vertical video display;
   (c) collimating lens means for focussing said vertical video display at infinity to thereby provide a wide field of view video display; and (C) means for mounting said visor assembly to said helmet.

2. A helmet mounted visual display system according to claim 1 wherein a left and right horizontal video displays are provided to produce a stereo video display and wherein left and right parabolic mirrors and left and right collimating lens means are provided to produce a stereo wide field of view video display.

3. A helmet mounted visual display system according to claim 1 wherein said collimating lens means comprises two collimating lenses wherein one of said collimating lenses is located in front of each eye of the individual.

4. A motorcycle stimulator which is capable of movement with six degrees of freedom to provide an operator with a realistic simulation of riding a motorcycle, said simulator comprising:

a support structure having a left side, a right side, a front end and a rear end;

a motorcycle mount assembly attached to said support structure;

a motorcycle frame having a front end and a rear end and including a front fork assembly, main frame and rear fork assembly wherein said motorcycle frame is attached to said mount assembly at said main frame;

sway means for controllably moving said motorcycle mount assembly between the left and right sides of said support structure;

surge means for controllably moving said motorcycle mount assembly between the front and rear ends of said support structure;

roll means for controllably moving the motorcycle frame from a vertical position to inclined positions on the left or right side of said vertical position;

yaw means for controllably pivoting the motorcycle mount assembly to provide horizontal rotation of said motorcycle frame relative to said support structure;

front fork elevator means for controllably lowering and raising the front end of said motorcycle frame;

rear fork elevator means for controllably lowering and raising the rear end of said motorcycle frame independently of said front fork elevator means wherein said sway means, surge means, roll means, yaw means, front fork elevator means and rear fork elevator means can be controlled to provide movement of said motorcycle frame with six degrees of freedom to thereby provide a realistic simulation of riding a motorcycle; and visual display means for providing a visual representation which simulates the riding of a motorcycle, said visual display means comprising a helmet mounted visual display system comprising:

a. a helmet shaped to be worn by an individual, said helmet having a surface defining a front visual opening in front of the individual's eyes;

b. a visor assembly located in front of said front visual opening, said visor assembly comprising:
   (1) a horizontal video display;
   (2) a parabolic mirror having a curvature sufficient to expand said horizontal video display and being positioned to reflect said horizontal video display to provide a vertical video display;
   (3) collimating lens means for focusing said vertical video display at infinity to thereby provide a wide field of view video display; and c. means for mounting said visor assembly to said helmet.

5. A motorcycle simulator which is capable of movement with six degrees of freedom to provide an operator with a realistic simulation of riding a motorcycle, said simulator comprising:

a support structure having a left side, a right side, a front end and a rear end;

a motorcycle mount assembly attached to said support structure;

a motorcycle frame having a front end and a rear end and including a front fork assembly, main frame and rear fork assembly wherein said motorcycle frame is attached to said mount assembly at said main frame;

sway means for controllably moving said motorcycle mount assembly between the left and right side of said support structure;

roll means for controllably moving the motorcycle frame from a vertical position to inclined positions on the left or right side of said vertical position;

yaw means for controllably pivoting the motorcycle mount assembly to provide horizontal rotation of said motorcycle frame relative to said support structure;

front fork elevator means for controllably lowering and raising the front end of said motorcycle frame;

rear fork elevator means for controllably lowering and raising the rear end of said motorcycle frame independently of said front fork elevator means wherein said sway means, surge means, roll means, yaw means, front fork elevator means and rear fork elevator means can be controlled to provide movement of said motorcycle frame with six degrees of freedom to provide a realistic simulation of riding a motorcycle; and visual display means for providing a visual representation which simulates the riding of a motorcycle, said visual display means comprising a helmet mounted visual display system comprising:

a. a helmet shaped to be worn by an individual, said helmet having a surface defining a front visual opening in front of the individual's eyes;

b. a visor assembly located in front of said front visual opening, said visor assembly comprising:
   (1) a vertical video display positioned for viewing through said front visual opening;
   (2) collimating lens means for magnifying and focusing said vertical video display at infinity to thereby provide a wide field of view video display; and c. means for mounting said visor assembly to said helmet.

* * * * *